No. 767,895. PATENTED AUG. 16, 1904.
C. W. KELLEY.
PIN TONGUE JOINT.
APPLICATION FILED FEB. 23, 1904.
NO MODEL.

WITNESSES
Andrew J. Petten
John Mitchell

INVENTOR
Chester W. Kelley
per S. Scholfield
ATTY.

No. 767,895. Patented August 16, 1904.

UNITED STATES PATENT OFFICE.

CHESTER W. KELLEY, OF PROVIDENCE, RHODE ISLAND.

PIN-TONGUE JOINT.

SPECIFICATION forming part of Letters Patent No. 767,895, dated August 16, 1904.

Application filed February 23, 1904. Serial No. 194,963. (No model.)

*To all whom it may concern:*

Be it known that I, CHESTER W. KELLEY, a citizen of the United States, residing at Providence, in the State of Rhode Island, have invented a new and useful Improvement in Pin-Tongue Joints, of which the following is a specification.

The nature of my invention consists in the improved construction of the post to which the tongue is jointed and in the combination of the pin-tongue therewith.

Figure 1:
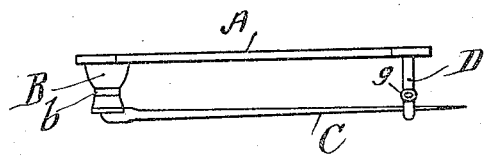
Figure 2:
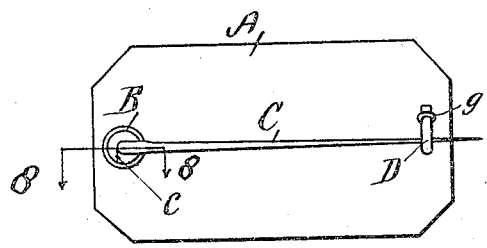
Figure 3:
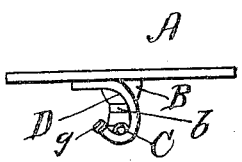
Figure 4:
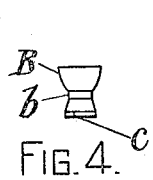
Figure 5:
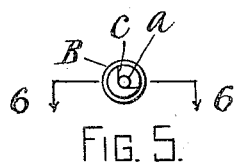
Figure 6:
Figure 7:
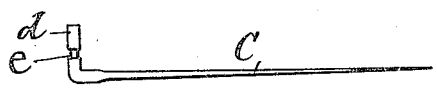
Figure 8:
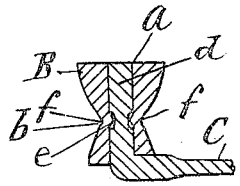

In the accompanying drawings, Figure 1 represents the side view of a brooch-pin provided with my improved pin-tongue joint. Fig. 2 represents a back view of the same. Fig. 3 represents an end view. Fig. 4 represents a side view of the joint-post. Fig. 5 represents an end view of the same. Fig. 6 represents a section taken in the line 6 6 of Fig. 5. Fig. 7 represents a side view of the tongue. Fig. 8 represents an enlarged detail section taken in the line 8 8 of Fig. 2, showing the construction of the joint.

In the drawings, A represents the plate of the brooch-pin; B, the pivot-post; C, the pin-tongue, and D the engaging hook for the pin-tongue. The post B is provided with a central bore $a$ and with a contracted neck $b$ and also provided at its outer end with the limiting-shoulder $c$, which serves to prevent further swinging movement of the pin-tongue D. The shank $d$ of the pin-tongue C is turned at right angles to the pin and provided with a circumferential groove $e$, and upon the insertion of the shank $d$ of the pin into the bore $a$ of the post C and the indenting of the neck $b$ of the post at its opposite sides $f f$, as shown in Fig. 8, the shank of the pin will be properly held in the post, the metal of the post at the opposite sides of the bore $a$ being forced into the groove $e$ of the shank. The hook D, which serves to hold the pin-tongue in its engaged position, is provided at its end with the knob $g$, which serves to prevent the accidental disengagement of the pin-tongue from the hook.

I claim as my invention—

1. In a pin-tongue joint, the combination of the pin-tongue having a deflected shank provided with a holding-groove, with the hollow post having a contracted neck, and having its bore constricted at the contracted neck into the holding-groove of the shank of the pin-tongue, substantially as described.

2. In a pin-tongue joint, the combination of the pin-tongue having a deflected shank provided with a holding-groove, with the hollow post having a contracted neck and a limiting-shoulder for the lateral traverse of the pin-tongue, and having its bore constricted at the contracted neck into the holding-groove of the shank of the pin-tongue, substantially as described.

CHESTER W. KELLEY.

Witnesses:
SOCRATES SCHOLFIELD,
JOHN S. LYNCH.